April 13, 1965  R. W. AUGUSTUS  3,178,042
RETRACTABLE REAR-VIEW MIRROR ASSEMBLY
Filed May 22, 1963  2 Sheets-Sheet 1
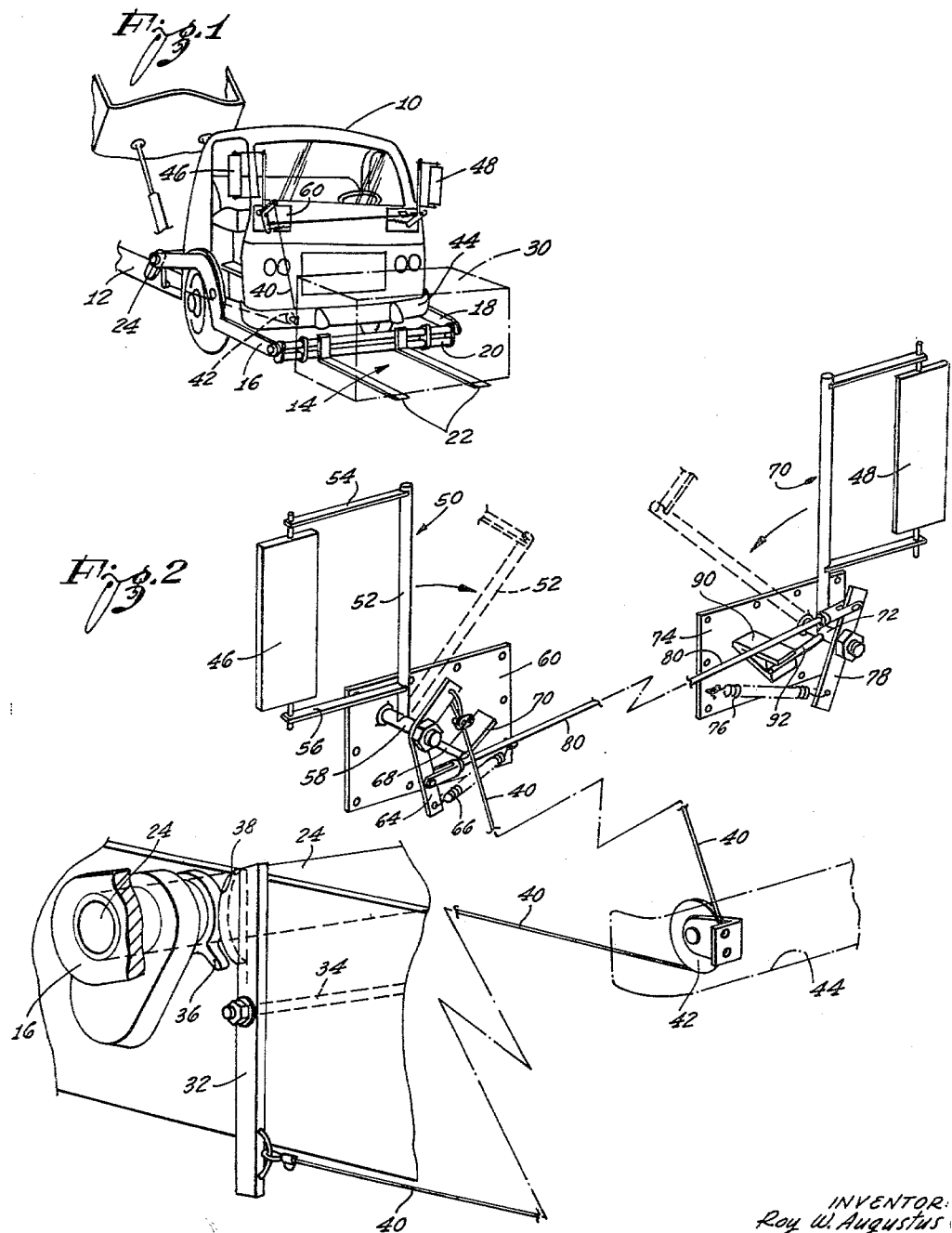
INVENTOR:
Roy W. Augustus
By Warren T. Jessup
Attorney.

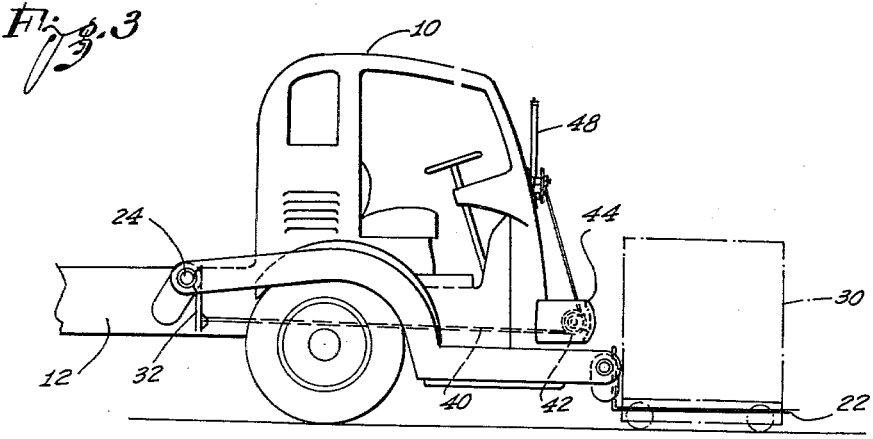
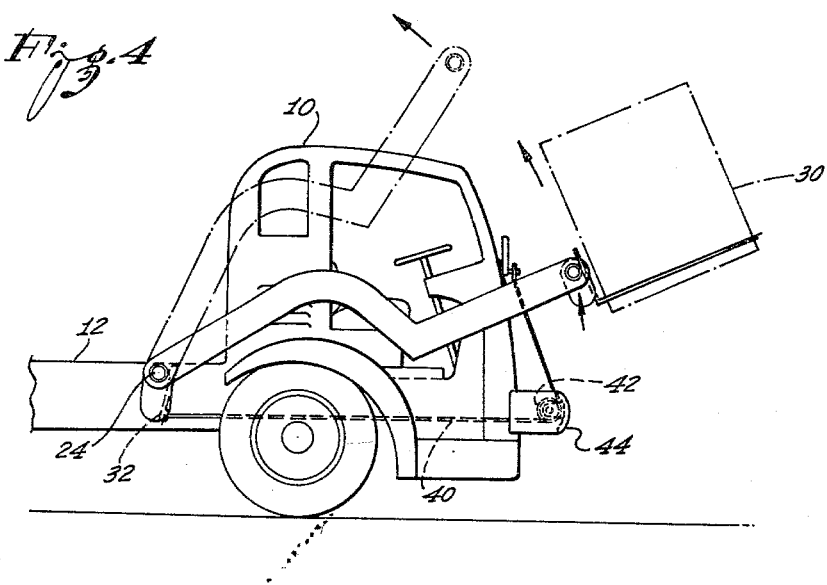

3,178,042
RETRACTABLE REAR-VIEW MIRROR ASSEMBLY
Roy W. Augustus, 14602 E. Francisquito, Puente, Calif.
Filed May 22, 1963, Ser. No. 282,511
2 Claims. (Cl. 214—77)

The present invention relates to an improved retractable rear-view mirror assembly.

The invention is particularly concerned with an improved retractable rear-view mirror assembly for installation on trucks of the type having auxiliary components which move along paths such that interference would be encountered by the rear-view mirrors of the trucks in their normal positions.

The assembly and mechanism of the present invention is of the same general type described in Patent 3,059,790, which was issued to the present inventor on October, 23, 1962.

The retractable rear-view mirror assembly and mechanism of the present invention is particularly adapted for installation in trucks of the type equipped with a fork-lift mechanism at the front of the truck for raising a receptacle of refuse up over the cab of the truck and for dumping its contents into the body, or refuse-receiving compartment, of the truck.

As mentioned in the aforesaid patent, rear-view mirrors which are normally positioned at the sides of the driver's cab for proper rear viewing are in the way of the lift arms of the loading equipment, such as of the fork-lift mechanism described in the preceding paragraph.

An object of the present invention is to provide an improved and simplified retractable rear-view mirror mechanism and assembly for a truck of the type described above, whereby the rear-view mirrors are properly positioned for rear viewing when the fork-lift mechanism is in either its load-receiving down position or in its up, dumping position; and by which the rear-view mirrors are automatically retracted out of the paths of the lift arms of the fork-lift mechanism when the mechanism is actuated between its lower position and its upper, dumping position, and vice versa.

The retractable mirror assembly described in the aforementioned patent is primarily intended for use with a refuse truck, or the like, which includes a loading bucket or scoop. The bucket used in the truck described in the patent is pivotally mounted on the truck to be moved between a lower, loading position at the front of the truck; and an upper dumping position up over the body of the truck.

The aforesaid bucket of the truck described in the patent is normally disposed in its upper position when the truck is in motion, and it is lowered to its lower position in the front of the truck only when a quantity of refuse is to be loaded into the bucket for subsequent dumping into the body of the truck.

Therefore, the retractable mirror assembly described in the patent provides for the rear-view mirrors to be in their normal positions for proper rear viewing when the bucket of the mechanism is in its upper, dumping position, because the bucket is normally carried in that position when the truck is in motion; and the mechanism described in the patent causes the mirrors to be retracted when the bucket is lowered to its loading position down at the front of the truck, at which time the truck is normally stopped.

The mechanism and assembly of the present invention, however, is intended for use with a fork-lift truck, as mentioned above. The mechanism of the present invention provides for the rear-view mirrors to be in their normal positions for proper rear viewing when the fork-lift mechanism is in its upper or in its lower position, for use when the truck is in motion; and to cause the mirrors to be retracted out of the paths of the lift arms only when the fork-lift mechanism is moved between its upper and lower positions, or vice versa.

Another object of the invention, therefore, is to provide an improved and simplified retractable rear-view mirror assembly for use in trucks of the above-mentioned fork-lift type.

Yet another object of the invention is to provide such an improved retractable rear-view mirror assembly which is eminently simple in its construction, and which can be easily and simply installed in trucks of the above-mentioned type.

Other objects and advantages of the invention will become apparent from a consideration of the following description, when the description is taken in conjunction with the accompanying drawings, in which:

FIGURE 1 is a fragmentary perspective view of a truck in which the improved retractable mirror assembly of one embodiment of the invention is mounted;

FIGURE 2 is a schematic diagram illustrating the various components of the mechanism and assembly of the embodiment shown in FIGURE 1;

FIGURE 3 is a side elevational fragmentary view of the truck of FIGURE 1, in which the assembly of one embodiment of the invention is mounted, with the lifting mechanism of the truck being disposed in the lower, loading position; and FIGURE 4 is a view, similar to the view of FIGURE 3, and showing the lifting mechanism being moved from its lower to its upper position.

As illustrated in the drawings, the truck under consideration includes a cab 10 and a chassis 12 of usual construction. The truck also includes a fork-lift mechanism 14 which, in turn, includes a pair of side lift arms 16 and 18, a cross member 20, and a pair of spaced and parallel forwardly extending forks 22.

The lift arms 16 and 18 are pivotally mounted on a drive shaft 24. The shaft 24 is rotatably mounted on the chassis 12, and it extends across the chassis to the rear of the cab 10. Appropriate hydraulic apparatus is coupled to the shaft 24 to cause it to rotate from one angular position to another, so as to cause the lift arms 16 and 18 to pivot between a lower position (FIGURES 1 and 3), through the intermediate position of FIGURE 4, to an upper dumping position.

The forks 22 are adapted to extend into the lower channels of a common type of trash receptacle 30. It is usual to drive the truck forwardly with the fork mechanism in its lower position, so as to permit the forks 22 to engage the lower channels of the receptacle 30. Then the fork-lift mechanism 14 is operated, and the forks 22 carry the receptacle 30 up over the top of the cab 10, and empty its contents into the body of the truck. The fork-lift mechanism is then returned to its lower position, and the truck is backed away, so as to release the receptacle 30.

The retractable rear-view mirror assembly of the invention includes a lever arm 32 which is pivotally mounted on a shaft, or other pivotal support means 34. A cam-like member 36 is mounted on the drive shaft 24, and this cam-like member moves against a cam follower member 38, mounted on the top end of the lever arm 32, as the drive shaft 24 rotates.

A cable 40 is secured to the lower end of the lever arm 32, and this cable runs to the front of the truck and around a pulley 42. The pulley 42 is mounted behind the front bumper 44 of the truck.

The truck includes a pair of rear-view mirrors 46 and 48 which are mounted on either side of the cab 10. As mentioned above, the mechanism of the invention is such that the mirrors 46 and 48 are in the position shown in FIGURES 1 and 3, for normal rear viewing, when the fork-lift mechanism 14 is in its down position.

However, when the mirrors 46 and 48 are in their normal positions, they are in the way of the lift arms 16 and 18, as these arms are pivoted from their lower position to their upper position.

The retractable mechanism of the present invention causes the mirrors 46 and 48 to swing in a vertical plane, arcuately inwardly, transversely to the longitudinal axis of the truck, as the fork-lift mechanism 14 is moved from its lower to its upper position. In this manner, the mirrors 46 and 48 are automatically moved out of the way of the lift arms 16 and 18, when the lift arms are pivoted between their lower and their upper positions, and vice versa.

The mirror 46 is mounted on an appropriate bracket 50 which includes an upright bar 52, and two transverse arms 54 and 56. The transverse arms 54 and 56 serve to support the mirror 46. As shown, the mirror 46 is pivotally mounted in the arms 54 and 56 for convenient adjustment by the driver for the desired rear-view angle, when the mirror is in its normal position.

The upright bar 52 is mounted on a rotatable shaft 58 which, in turn, is mounted on a mounting plate 60. The mounting plate is affixed to the front of the cab 10. The upright bar 52 extends radially from the shaft 58, and rotation of the shaft 58 causes the bar 52, and the entire bracket assembly 50, to be pivotally moved in a vertical plane along an arcuate path, between the normal position shown by the solid lines in FIGURE 2, and an inward retracted position shown by the dashed lines in FIGURE 2.

An actuating arm 64 is affixed to the shaft 58, and the cable 40 is attached to one end of the arm 64. A resilient spring 66 is attached to the other end of the arm 64 and to the mounting plate 60. This resilient spring 66 biases the shaft 58 angularly so as to bias the bracket 50 to its normal position, as shown by the solid lines in FIGURE 2.

The normal upright position of the bracket 50, and associated rear-view mirror 46, is established by an arm 68. This arm is affixed to the shaft 58 and extends radially therefrom. The arm 68 engages a stop member 70, which is affixed to the mounting plate 60, when the bracket is in its normal upright position.

The relationship of the cam 36 and cam follower 38 is such that when the fork-lift mechanism 14 is in the down position of FIGURE 1, the lever arm 32 is spring biased by the spring 66 against the cam, in position such that the bracket 50 and mirror 46 are in their normal upright positions.

However, when the fork-lift mechanism 14 is moved to its upper position, a protruding portion of the cam 36 engages the cam follower 38 to cause the lever arm 32 to pivot. This pivotal movement of the lever arm 32 causes the cable 40 to move the arm 64 against the tension of the spring 66, and to retract the bracket 50 arcuately inwardly to its retracted position, out of the way of the lift arm 16.

The mirror 48 is mounted in a bracket 70 which is similar to the bracket 50 described above. The latter bracket is mounted on a shaft 72 which, in turn, is mounted on a mounting plate 74. A spring 76 extending between an arm 78 on the shaft 72 and the mounting bracket 74 normally biases the bracket 70 to the illustrated upright normal position.

A connecting rod 80, extending between the arm 64 and the upper end of the arm 78, intercouples the mechanism associated with the mirror 46 with the mechanism associated with the mirror 48, so that both are moved arcuately inwardly to a down position, when the lift mechanism 14 is moved between its lower and its upper position. This causes the mirror 48 to be moved out of the way of the lift arm 18, at the same time that the mirror 46 is moved out of the way of the lift arm 16.

The mechanism associated with the mirror 48 includes a stop 90 affixed to the mounting plate 74, and a radial arm 92 on the shaft 72. As before, the arm and the stop establish the normal upright position of the bracket 70, and of the associated mirror 48.

The invention provides, therefore, a simple mechanism which may be easily installed in existing trucks. The mechanism serves as a convenient means for retracting the rear-view mirrors of the truck inwardly, upon the movement of its associated lift mechanism from its lower to its upper position, and vice versa.

It will be appreciated that the improved mechanism of the present invention is relatively inexpensive in that it requires relatively few components, and also that the mechanism can be mounted on a truck in a simple manner.

The mounting is accomplished merely by affixing the plates 60 and 74 to the front of the cab 10; by mounting the cam 36 on the drive shaft 24; by pivotally mounting the lever arm 32 on the side of the truck; and by intercoupling the lever arm with the mechanism of the rear-view mirrors by the cable 40, and its pulley 42.

While a particular embodiment of the invention has been shown and described, modifications may be made, and it is intended in the claims to cover all modifications which fall within the spirit and scope of the invention.

What is claimed is:

1. In combination with a truck having a driver's cab and loading means including arms movable along the sides of the cab, a rear-view mirror mounted outside of the cab to be normally disposed in a first position for rear view by a driver, and having retractable mirror mounting means for retracting to a second position inwardly out of the path of said arms, the provision of novel actuating means comprising:

cam means driven from a first position to a second position in coordination with the movement of said arms upwardly along the sides of the cab, and said cam means returning through the same path in the opposite direction upon movement of the said arms downwardly along the sides of the cab;

cam follower means driveably connected to said retractable mounting means for moving said mounting means and the mirror carried thereby between said first position and said second position and return;

said cam and cam follower having related surfaces cooperating in the cycle of movement of said cam in said first path movement for actuating said cam follower through a complete cycle and thereby causing said mirror to move from said first to said second position and back to said first position during upward movements of said arms; and said cam and cam follower being reversible to drive said mirror from said first to said second and back to said first position upon cam movements in the return direction of said cam path.

2. In combination with a truck having a forward driving compartment, a hauling compartment disposed rearwardly of said driving compartment, a pair of lift arms pivoted respectively at the sides of the truck, and a dump bucket secured to and between said arms, and extending transversely across the truck, and swingable by said arms from a first position in front of the truck in an arc over said driving compartment to a second position adjacent said hauling compartment whereby material may be transferred by said dump bucket from the front of the truck and elevated rearwardly to be disposed in said hauling compartment:

rear view mirror means for reflecting a view from the rear of the truck into said driver's compartment, and viewable fom said driver's compartment;

means for movably mounting said rear view mirror means for movement between two positions, one of said positions being transversely outwardly of the truck from which a clear view of the rear of the truck is seen from the driver's compartment but which lies in the path of movement of one of said arms, the other said position being located transversely inward from said first position, and out of the path of movement of said one of said arms; and, cam actuating means driven in relationship to the movement of said arms and having a cam follower means related thereto and coupled to said mounting means for operating said mirror means through a complete cycle from said position outward of the truck to the other position inward from said first position and back to the position outward of the truck as the arms move through a swing path between said first position and second position in either direction.

References Cited by the Examiner
UNITED STATES PATENTS 3,005,383  10/61  Pierson _____ 88—93
3,059,790  10/62  Augustus _____ 214—77

HUGO O. SCHULZ, *Primary Examiner.*